(12) United States Patent  (10) Patent No.: US 8,739,739 B2
Davis  (45) Date of Patent: Jun. 3, 2014

(54) APPARATUS FOR SUPPORTING AN ANIMAL WITH A SEATBELT

(76) Inventor: Robert L. Davis, Rochester, NY (US)

( * ) Notice: Subject to any disclaimer, the term of this patent is extended or adjusted under 35 U.S.C. 154(b) by 167 days.

(21) Appl. No.: 13/359,013

(22) Filed: Jan. 26, 2012

(65) Prior Publication Data

US 2013/0092100 A1 Apr. 18, 2013

Related U.S. Application Data

(60) Provisional application No. 61/547,417, filed on Oct. 14, 2011.

(51) Int. Cl.
*A01K 1/02* (2006.01)

(52) U.S. Cl.
USPC .......................................................... 119/771

(58) Field of Classification Search
CPC .................................................... A01K 1/0272
USPC ................... 119/771, 856–858, 863; 280/805; 297/482, 483, 487, 488
See application file for complete search history.

(56) References Cited

U.S. PATENT DOCUMENTS

| | | | | |
|---|---|---|---|---|
| 3,529,864 A | * | 9/1970 | Sharp et al. | 297/467 |
| 4,324,204 A | * | 4/1982 | Friedman | 119/771 |
| 4,559,906 A | | 12/1985 | Smith | |
| 4,817,562 A | | 4/1989 | Giroux | |
| 4,896,630 A | | 1/1990 | Luce | |
| 4,976,383 A | * | 12/1990 | Norris | 224/640 |
| 5,154,660 A | | 10/1992 | Snyder et al. | |
| 5,167,203 A | | 12/1992 | Scott et al. | |
| 5,421,614 A | * | 6/1995 | Zheng | 280/801.1 |
| 5,429,418 A | * | 7/1995 | Lipper et al. | 297/465 |
| D384,780 S | | 10/1997 | McLaughlin | |
| 6,086,158 A | * | 7/2000 | Zeoli | 297/482 |
| 6,142,575 A | * | 11/2000 | Patterson | 297/482 |
| 6,174,032 B1 | * | 1/2001 | Conaway | 297/487 |
| 6,564,749 B1 | | 5/2003 | Dorsey | |
| 6,601,540 B1 | * | 8/2003 | Davis | 119/771 |
| 6,637,377 B2 | * | 10/2003 | Lobanoff et al. | 119/792 |
| 7,311,063 B2 | * | 12/2007 | Goldberg | 119/771 |
| 7,343,881 B2 | | 3/2008 | Schantz et al. | |
| D621,561 S | | 8/2010 | Siklosi et al. | |
| 2009/0066146 A1 | | 3/2009 | Singh | |
| 2010/0263602 A1 | | 10/2010 | Cho | |

FOREIGN PATENT DOCUMENTS

CA 2535207 11/2006

* cited by examiner

*Primary Examiner* — David Parsley
*Assistant Examiner* — Danielle Clerkley
(74) *Attorney, Agent, or Firm* — Tracy Jong Law Firm; Tracy P. Jong; Louis Reale

(57) ABSTRACT

This invention generally relates to an animal or pet restraint apparatus for supporting an animal in a vehicle. The animal restraint apparatus adapted to engage with a vehicle seatbelt assembly having a waist strap portion and a shoulder strap portion. The apparatus is comprised of a flat tubular body having a tubular passage configured for releasably receiving the seatbelt assembly and a means for releasably engaging the back panel portion of the flat tubular body to the lower chest portion of a pet, avoiding the neck area. The present invention and its embodiments provide a means for safely and comfortably transporting a pet in a vehicle.

20 Claims, 6 Drawing Sheets

APPARATUS FOR SUPPORTING AN ANIMAL WITH A SEATBELT

RELATED APPLICATIONS AND PRIORITY CLAIM

This application claims priority to provisional application U.S. Ser. No. 61,547,417 filed in the name of Robert L. Davis of Rochester, N.Y. on Oct. 14, 2011. This application is incorporated by reference herein in its entirety.

FIELD OF THE INVENTION

This invention generally relates to an apparatus for supporting an animal in a vehicle. In a more specific aspect, this invention relates primarily to an animal support or restraint apparatus adapted to a motor vehicle type seatbelt assembly having a waist strap portion and a shoulder strap portion.

BACKGROUND OF THE INVENTION

Animal restraint harnesses for the purpose of restraining pets in motor vehicles are known in the art. For example, U.S. Pat. No. 4,817,562 (to Giroux), U.S. Pat. No. 6,564,749 B1 (to Dorsey), and U.S. Pat. Pub. No. 2009/0066146 A1 (to Singh), all describe motor vehicle pet restraints having seatbelt type connectors integrated as part of the harness assembly itself. Such seatbelt type connectors are typically heavy, clumsy, expensive devices that add to the shortcomings of such harnesses when incorporated thereon. Additionally, the control points in such restraints are linked to the integrated seatbelt type connectors. In such harnessing configurations, the control points tend to excessively wander, resulting in a compromised means for restraining a pet.

Other examples described by U.S. Pat. No. 4,896,630 (to Luce), and U.S. Pat. No. 5,167,203 (to Scott et al.) describe harness assemblies that engage a pet's sensitive neck area, and lack substantially stable, large area, pet engagement members to maximize the distribution of stresses to less sensitive, non-neck pet areas. U.S. Pat. No. 6,601,540 (to Davis) describes a single, neck engaging, panel member relying on a mere loop for securely engaging a seatbelt assembly.

Accordingly, in view of the foregoing deficiencies, there exists a clear motivation in the animal harnessing arts for new and useful improvements.

SUMMARY OF THE INVENTION

An animal restraint apparatus adapted to impermanently receive a seatbelt having a waist strap portion and a shoulder strap portion. The apparatus comprises a flat tubular body having a pliable front panel and a pliable back panel, wherein each panel includes a top edge, a bottom edge, a first side edge, a second side edge, a front surface and a back surface. The top edge of the pliable front panel is fastened to top edge of pliable back panel, and the bottom edge of the pliable front panel is fastened to the bottom edge of the pliable back panel. The flat tubular body tubular possesses a passage having a first tubular opening defined by the first side edge of the pliable front panel and the first side edge of the pliable back panel and a second tubular opening defined by the second side edge of the pliable front panel and the second side edge of the pliable back panel. The generally tubular passage is configured for releasably receiving a modern-day seatbelt assembly. Additionally, the flat tubular body incorporates a means for releasably engaging the back surface of the pliable back panel of the flat tubular body to the lower chest portion of a pet.

Accordingly, it is an object of the present invention to provide an animal harnessing restraint or support apparatus that is compatible with existing seatbelt systems found in most modern-day motor vehicles such as automobiles, trucks, and the like. The restraint apparatus in combination with the existing seatbelt system provides a removable means for providing support to the animal donning the restraint apparatus.

It is another object of the present invention to provide an animal restraint apparatus or device that precludes contact with the sensitive neck area of an animal or pet. Instead, the apparatus directs supporting engagement to the lower chest or sternum portion of the pet.

It is yet another object directed to particular embodiments of the present invention to provide an animal restraint apparatus that is mountable in more than one orientation onto the pet, and can be adapted to a variety of seat locations in the motor vehicle.

It is yet another object of the present invention to provide a device that is durable, washable, reliable, and portable.

It is yet another object of the present invention to provide a device that can be easily mounted and operated by a single user.

It is yet another object of the present invention to provide a device that is generally tubular including an inner passage having substantial surface area to frictionally engage the portion of the seatbelt residing therein.

It is yet another object of the present invention to provide a device that is mounted onto a pet, utilizing an interactive support system that is capable of dynamically adjusting itself to incessant pet movements. Such interactive support systems include the use of elastic belts or straps, belt retractors, and the like.

It is yet another object of this invention to provide a relatively simple device that is economical from the viewpoint of the manufacturer and consumer, is susceptible to low manufacturing costs with regard to labor and materials, and which accordingly is then susceptible of low prices for the consuming public, thereby making it economically available to the buying public.

Whereas there may be many embodiments of the present invention, each embodiment may meet one or more of the foregoing recited objects in any combination. It is not intended that each embodiment will necessarily meet each objective.

Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

In this respect, before explaining at least one embodiment of the invention in detail, it is to be understood that the invention is not limited in its application to the details of construction and the arrangements of the components set forth in the following description or illustrated in the drawings. The present invention is capable of other embodiments and of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent construction insofar as they do not depart from the spirit and scope of the conception regarded as the present invention.

PARTICULAR ADVANTAGES OF THE INVENTION

The present invention provides a user with a simple, cost-effective apparatus for securing a pet to a variety of vehicles, including automobiles, trucks, boats, and the like. The primary focus of the present invention is to provide an apparatus that functionally utilizes and exploits the seatbelt systems typically found in modern-day motor vehicles designed for human use. The animal support apparatus is primarily configured to receive and utilize the motor vehicle's existing seatbelt assemblies intended for humans. Such a configuration yields a device of reduced complexity, cost, weight, over the prior art devices having seatbelt fastener integrated therein. The installation and removal of the device of the present invention is simple and does not require any tools, complex fasteners or attachments.

The present invention functions particularly well with typical modern seatbelt systems that are adjustably-retracting. One such system that is commonly used in modern seatbelt systems incorporates the Emergency Locking Retractor (ELR) feature, which immobily locks the seatbelt only during times of vehicle sudden deceleration. When the animal support apparatus of the present invention is attached to such a seatbelt system, a pet utilizing the device is afforded several advantages. The pet enjoys additional comfort due to the generous range of movement during a typical driving experience where the seatbelt is operating in an unlocked, adjustably-retracting condition; and is equipped with the restraining power of the modern seatbelt's Emergency Locking Retractor during times of sudden deceleration, where the seatbelt immobily locks.

Additionally, certain animal support embodiments of the present invention include interactive support systems that are capable of actively accommodating the engagement characteristics of the pet support device pertaining to engagement of the device to the pet. Such an interactive support system includes a self-adjusting pet mounting strap that adapts to the pet's ever changing spatial orientation, breathing characteristics, and the like.

BRIEF DESCRIPTION OF THE DRAWINGS

The ensuing detailed description section makes reference to the annexed drawings. An enhanced understanding of the present invention will become evident when consideration is given to the detailed description thereof and objects other than the aforementioned become apparent. The invention will be described by reference to the specification and the annexed drawings, in which like numerals refer to like elements, and wherein.

Figure 1:
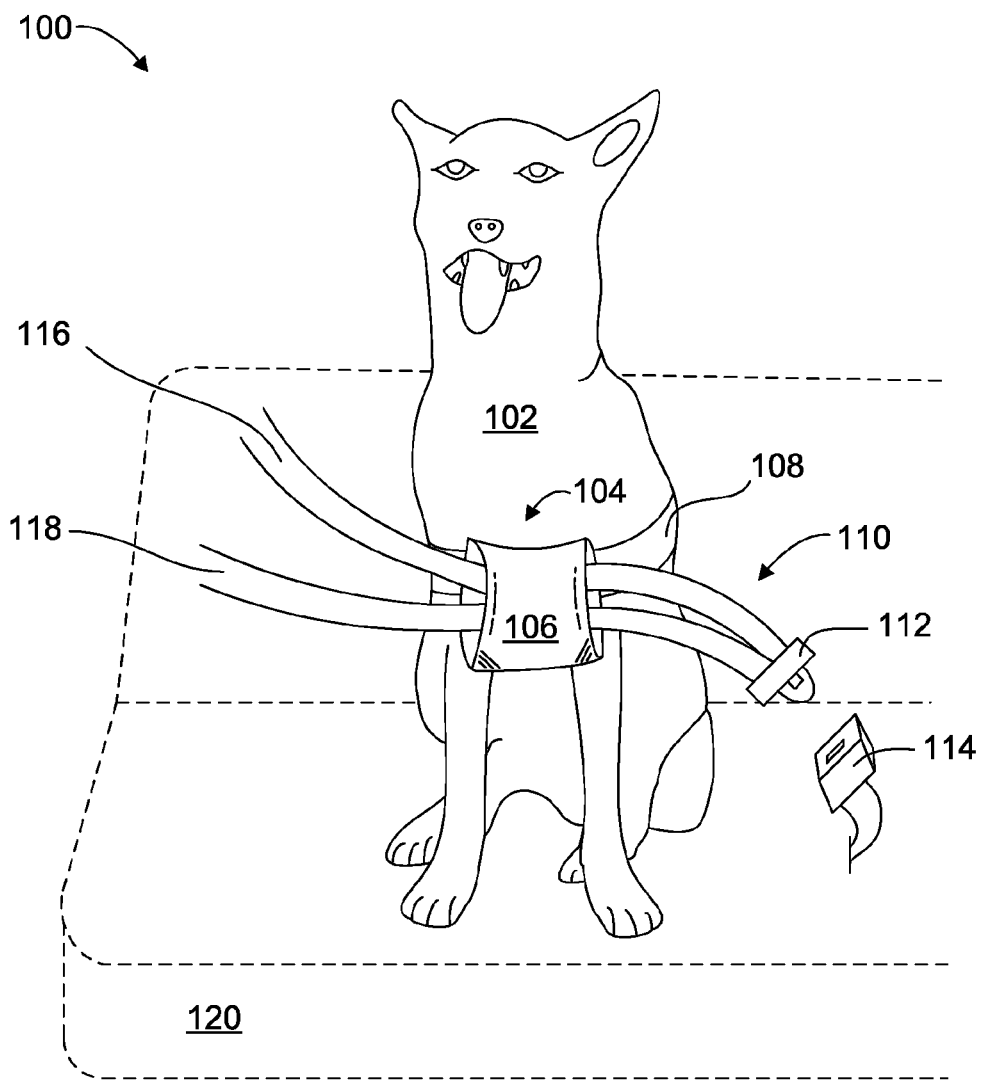
FIG. 1 illustrates a perspective view of an exemplary pet mounting scenario 100 situated in backseat 120 of a motor vehicle.

The drawings are not to scale, in fact, some aspects have been emphasized for a better illustration and understanding of the written description.

DEFINITIONS OF TERMS USED IN THIS SPECIFICATION

The apparatus for supporting an animal in a vehicle discussed throughout this disclosure shall have equivalent nomenclature, including the device, the supporting apparatus, the apparatus, the present invention, or the invention. Additionally, the term "exemplary" shall possess a single meaning throughout this disclosure; wherein the sole definition pertains to serving as an example, instance, or illustration.

The term actively accommodating is understood to include and define a pet support/holding means that continuously provides an engagement pressure directed towards the pet while allowing for length adjustments of the of holding straps, belts, or the like. Such actively accommodating attributes can be achieved by mechanical retractors, elastic materials, and the like.

To help facilitate the understanding of this disclosure and the location of figures or drawings corresponding to discussion addressed part numbers, a systematic parts/features numbering convention has been employed. The first digit in three digit part numbers refers to the figure number where the part was first introduced, or is best depicted. Likewise, in four digit part numbers, the first two digits refer to the figure number where the part was first introduced, or is best depicted. Although this disclosure may at times deviate from this convention, it is the intention of this numbering convention to enable expeditious comprehension of the disclosure.

PARTS/FEATURES LIST 100. exemplary pet mounting scenario
102. dog, pet, or animal
104. animal restraint apparatus
106. flat tubular body
108. back mounting strap (engages the back 204 portion of pet)
110. seatbelt assembly (affiliated with backseat 120)
112. latch plate (engages with latch portion of seatbelt system)
114. latch-portion of seatbelt system (lockingly accepts latch plate 112)
116. shoulder strap portion (of seatbelt assembly 110)
118. waist strap portion (of seatbelt assembly 110)

120. backseat (situated in an automobile type of motor vehicle)
200. dog, pet, or animal
202. lower chest portion
204. back
206. forelegs
208. hind legs
300. flat tubular body
302. first tubular opening (of flat tubular body)
304. second tubular opening (of flat tubular body)
306. top edge (of flat tubular body)
308. bottom edge (of flat tubular body)
400. tubular body assembly (exploded view)
402. pliable front panel
404. top edge (of pliable front panel 402)
406. bottom edge (of pliable front panel 402)
408. first side edge (of pliable front panel 402)
410. second side edge (of pliable front panel 402)
412. front surface (of pliable front panel 402)
414. back surface (of pliable front panel 402)
416. pliable back panel
418. top edge (of pliable back panel 416)
420. bottom edge (of pliable back panel 416)
422. first side edge (of pliable back panel 416)
424. second side edge (of pliable back panel 416)
426. front surface (of pliable back panel 416)
428. back surface (of pliable back panel 416)
500. animal restraint apparatus (with engaging seatbelt)
600. animal restraint apparatus (with flat tubular body fasteners)
602. first portion of fastener (for flat tubular body)
604. second portion of fastener (for flat tubular body)
700. animal restraint apparatus with hook and loop back strap assembly 706
702. flat tubular body
704. rigid ring (for accepting back strap assembly 706)
706. back mounting strap assembly with hook and loop fastener
708. first portion (hook and loop fastener)—affixed to distal portion of strap
710. second portion (hook and loop fastener)—affixed to proximate portion
800. animal restraint apparatus with a back strap assembly employing quick
release connectors
802. flat tubular body
804. first portion of quick release connector
806. second portion of quick release connector
808. back strap assembly (including quick release connectors)
810. adjustment clip
900. animal restraint apparatus (with back strap assembly 906 employing strap retractor 908)
902. flat tubular body
904. strap locking means (buckle)
906. back strap assembly (employing strap retractor 908)
908. strap/belt retractor
910. strap/belt coil
1000. top view of animal restraint apparatus 900 (with sectional view of pet 102)

DETAILED DESCRIPTION

With reference to the drawings of the present invention, several embodiments pertaining to the apparatus for supporting an animal with a seatbelt will be described. In describing the embodiments illustrated in the drawings, specific terminology will be used for the sake of clarity. However, the invention is not intended to be limited to the specific terms so selected, and it is to be understood that each specific term includes all technical equivalents that operate in a similar manner to accomplish a similar purpose.

In this context, the apparatus for supporting an animal with a seatbelt or seatbelt assembly may be constructed from a variety of durable materials including materials derived from natural sources such as leather, cotton based textiles, and the like; as well as synthetic type materials—such as nylon, polyester; or any combination thereof. In preferred embodiments the device is constructed from washable, wear-resistant, type of materials or material combinations. It is understood that material considerations are largely dependent on a variety of factors, including: the desired properties or characteristics of the device dictated by pet attributes, the type of transport vehicle utilized, expected environmental conditions, device cost considerations, and the like.

FIG. 1 illustrates a perspective view of an exemplary pet mounting scenario 100, situated in backseat 120 of a motor vehicle. Animal restraint apparatus 104 comprises flat tubular body 106 possessing at least one back mounting strap 108. The animal restraint apparatus 104 or assembly is configured to circumferentially engage dog, pet, or animal 102. Flat tubular body 106 is configured to receive seatbelt assembly 110 which is typically integrated or associated with backseat 120. Typically, any seating location in a modern-day motor vehicle possesses a seatbelt assembly 110, or the like, associated therewith. Seatbelt assembly 110 is comprised of shoulder strap portion 116, waist strap portion 118, latch plate 112, and latch 114. Both shoulder strap portion 116, waist strap portion 118 pass through flat tubular body 106, where the two straps converge at latch plate 112. Latch plate 112 is configured to lockingly engage with securely anchored latch 114.

Seatbelt assembly 110 (as shown in FIG. 1) can provide an actively accommodating means of supporting pet 102 via the use of seatbelt retracting mechanisms typically attached to modern-day seatbelt systems. The retracting mechanisms provide a pulling force that will, in turn, produce a substantially constant engagement pressure between flat tubular body 106 and lower chest portion 202 of pet (as shown in FIG. 2).

Figure 2:
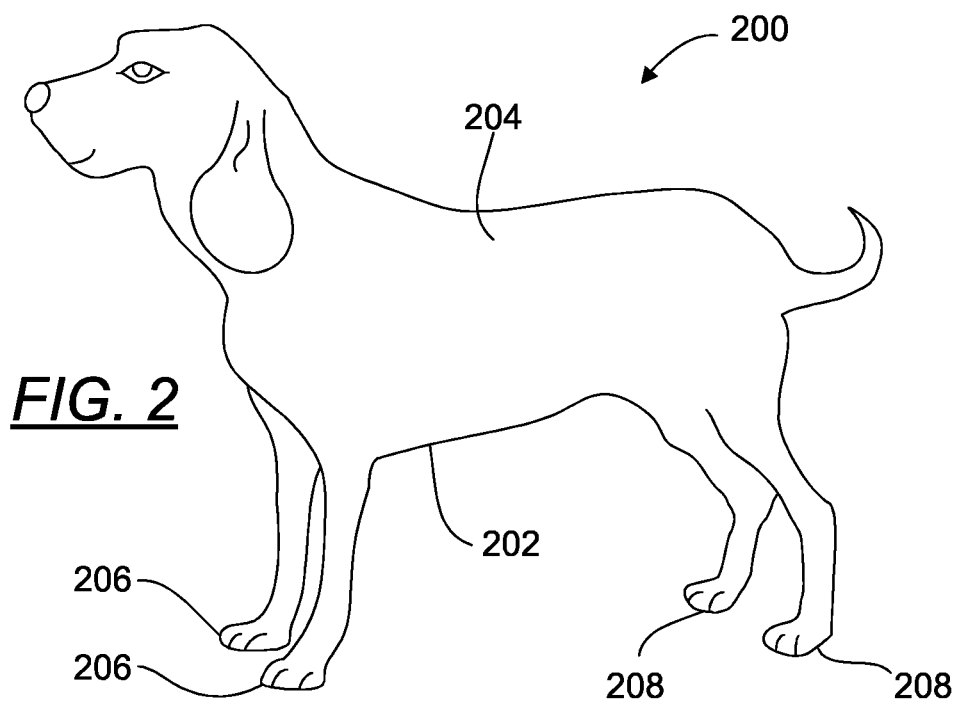
FIG. 2 illustrates a perspective side view of an exemplary dog 200.

FIG. 2 illustrates a perspective side view of an exemplary dog 200. It is understood that dog 200 can represent a variety of pets, animals, and the like. Depicted features of dog 200 include: back 204, forelegs 206, hind legs 208, and lower chest portion 202. Lower chest portion 202 depicted is in the approximate area of the sternum.

Figure 3:
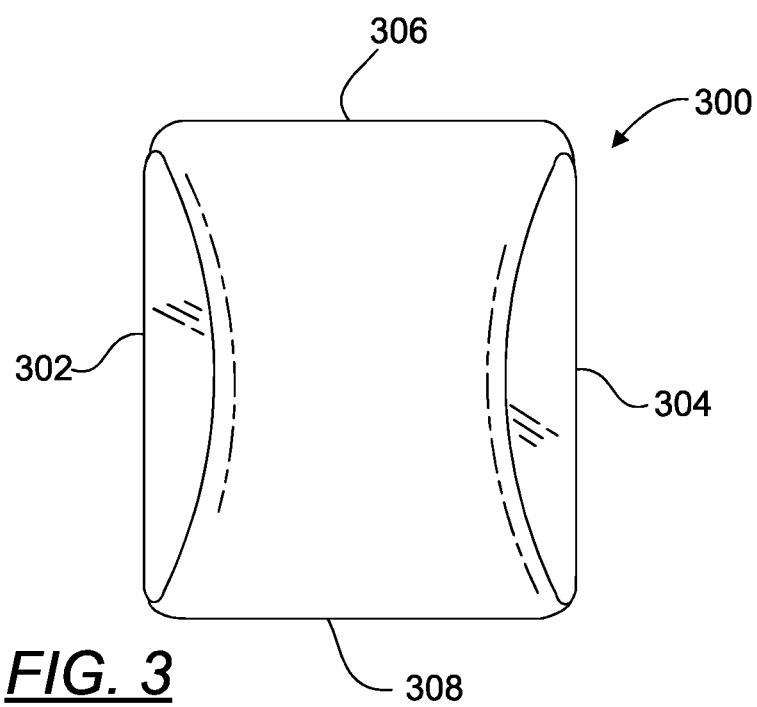
FIG. 3 illustrates a front view of flat tubular body 300.

FIG. 3 illustrates a front view of flat tubular body 300. Depicted portions of flat tubular body 300 include: first tubular opening 302, second tubular opening 304, top edge 306, and bottom edge 308. First tubular opening 302 and second tubular opening 304 are adapted to receive seatbelt assembly 110 as depicted in FIG. 1.

Figure 4:
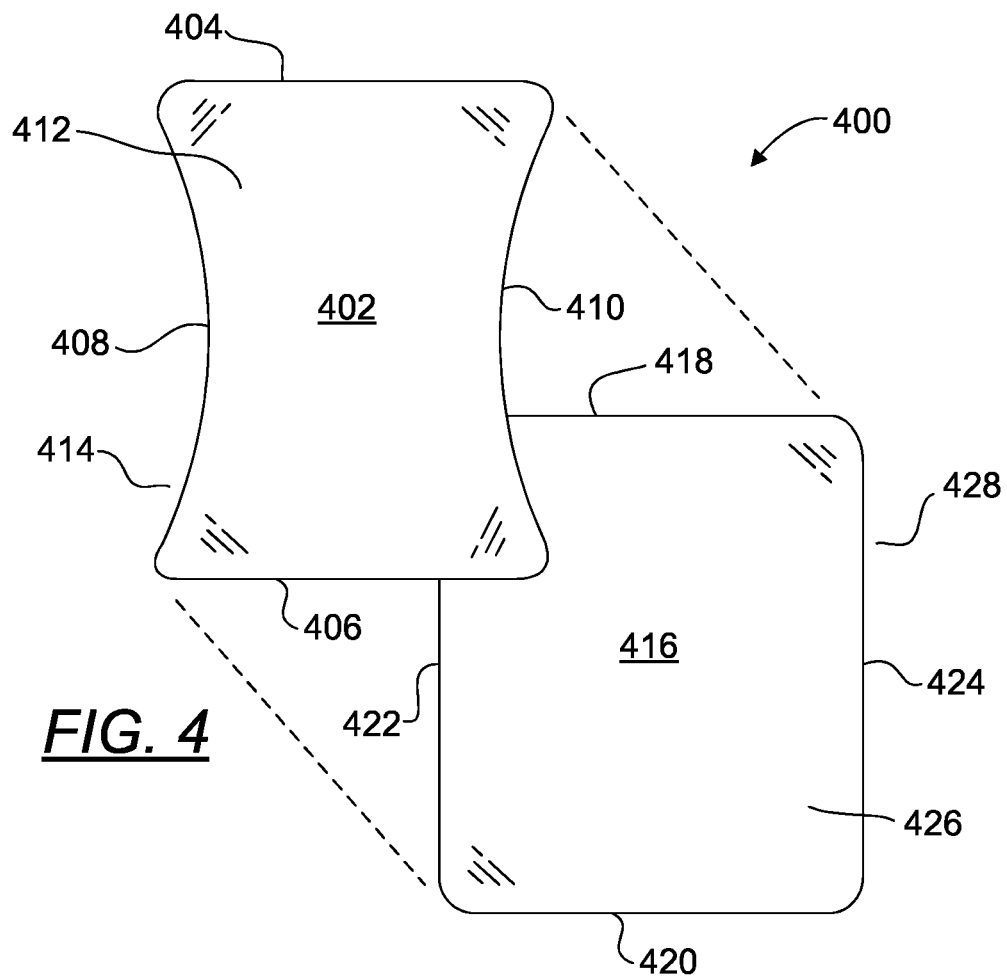
FIG. 4 illustrates an exploded front view of flat tubular body 300, comprised of pliable front panel 402 and pliable back panel 416.

FIG. 4 illustrates tubular body assembly 400—an exploded front view of flat tubular body 300, comprised of pliable front panel 402 and pliable back panel 416. Pliable front panel 402 is comprised of the following depicted elements: top edge 404, bottom edge 406, first side edge 408, second side edge 410, front surface 412, and back surface 414. Pliable back panel 416 is comprised of the following depicted elements: top edge 418, bottom edge 420, first side edge 422, second side edge 424, front surface 426, and back surface 428.

Top edge 404 of pliable front panel 402 is integrated with or fastened to top edge 418 of pliable back panel 416, and bottom edge 406 of pliable front panel 402 is integrated with or fastened to bottom edge 420 of pliable back panel 416 thereby creating a tubular passage. The tubular passage is comprised of a first tubular opening 302 (shown in FIG. 3) defined by first side edge 408 and first side edge 422, and second tubular opening 304 (shown in FIG. 3) defined by second side edge 410 and second side edge 424. The internal portion of the tubular passage is configured from back surface 414 of pliable front panel 402 and front surface 426 of pliable back panel 416; and is configured for releasably receiving a seatbelt assembly 110 as shown in FIG. 1. Back surface 428 of pliable back panel 416 is adapted to releasably engage to lower chest portion 202 of a dog, pet, or animal 102 as depicted in FIG. 1.

By way of example, but not limitation, pliable front panel 402 is substantially similar to pliable back panel 416 with regards to depicted surface area and geometry such that a passage or tunnel of sufficient depth is created to closely engage a seatbelt assembly 110 as shown in FIG. 1. Additionally, in preferred embodiments, back surface 414 of pliable front panel 402 and front surface 426 of pliable back panel 416 are naturally drawn toward each other as a default condition; such an arrangement provides snug engagement with shoulder strap 116 and waist strap 118, which tend to keep the straps flat and in position. The depicted configuration overcomes the weak engagement that exists when a mere strap is used as disclosed in U.S. Pat. No. 6,601,540 (to Davis). The maximum width of a strap is typically no more than a couple of inches, which is quite flimsy in comparison with the aforementioned tubular configuration of the present invention.

Figure 5:
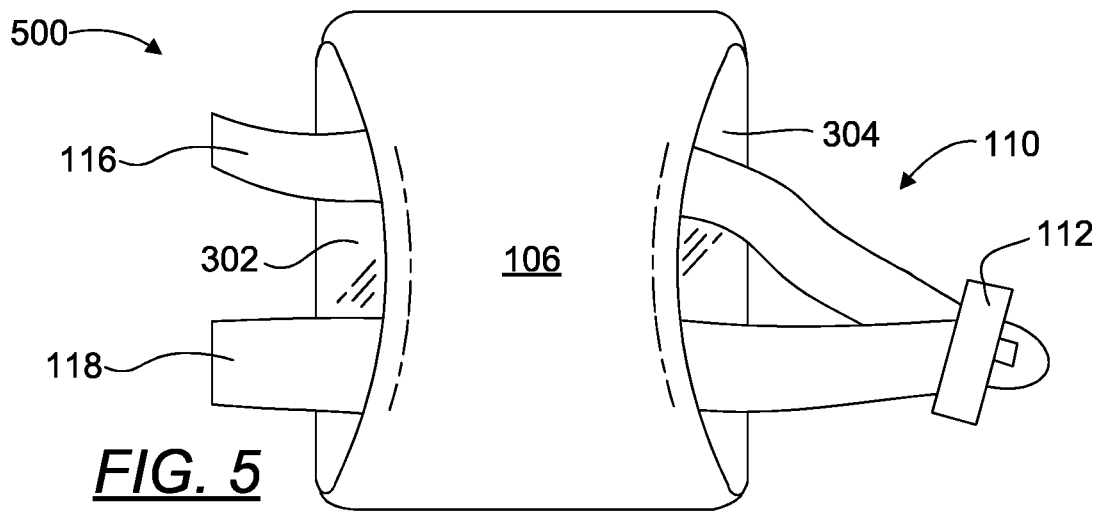
FIG. 5 illustrates a front view of flat tubular body 106 linked or stored on seatbelt assembly 110.

More specifically, depicted pliable front panel 402 possesses first side edge 408 and second side edge 410 that are both curvilinear. The curvilinear feature is presented by way of example, but not limitation. Advantages to curvilinear side edges include an aesthetically pleasing frontal design as well as facilitating the insertion of seatbelt assembly 110 as illustrated in FIGS. 1 and 5. The curvilinear feature can be utilized on the first side edge 408, or second side edge 410, or any combination thereof.

Any combination of pliable front panel 402 and pliable back panel 416 can possess a composite or multilayer configuration. For example, pliable back panel 416 can be configured from a resilient padding material protected by a flexible outer covering. The resilient padding material can be selected from a variety of resilient, flexible foam type of material having sufficient thickness to serve as a shock absorber and facilitate handling. Exemplary resilient padding materials include: polyethylene foams, neoprene (polychloroprene) foams, rubber foams such as polyvinyl chloride nitrile butadiene, and the like. Such padding materials are available in a variety of thicknesses. A functional thickness range for use in pliable back panel 416 ranges from about ⅛ inches to about 2.0 inches, and a preferable thickness ranges from about ¼ inches to about ¾ inches.

The flexible outer covering for protecting the resilient padding material can be selected from a variety of sheet type materials (e.g. fabrics, textiles, and the like).

Exemplary materials include: leather, canvas, natural (e.g. cotton), polymeric (synthetic) textiles, or any combination thereof. Polymeric textiles are preferred due to their strength, washability, durability, among other desirable attributes. Said polymeric textiles include materials such as Nylon, Cordura, Polyester, the like, and combination blends thereof.

As aforementioned, pliable front panel 402 can also be configured as composite having a multilayer anatomy. An exemplary configuration of a composite front panel 402 is comprised of a flexible overlayer covering a pliable stiffening material. The inner pliable stiffening material is configured to impart a predetermined amount of stiffness or structure to front panel 402, while concurrently permitting the panel to take on a bowed configuration, thereby providing a means for the panel to better conform to pet geometry, i.e. lower chest portion of a pet. The inner stiffening material can be configured from a variety of flexible sheet type materials such as ABS (Acrylonitrile butadiene styrene), HDPE (High-density polyethylene), or the like. In order for the chosen inner stiffening material to simultaneously possess the proper balance between the support structure function (stiffness) and flexibility, a harmonization of determinant geometric sheet attributes and material properties is required. For example, both ABS and HDPE materials having an approximate thickness of 0.093 inches were tested as a front panel 402 stiffening material, both configurations resulted in front panels that were not pliable enough to provide the desired bowed configuration when engaging a pet. A front panel 402 stiffening material configured from HDPE having an approximate sheet thickness of 0.040 inches also proved too inflexible for the application. A successful embodiment was attained when using an inner stiffening material configured from ABS having the same approximate sheet thickness of 0.040 inches, wherein the preferred harmonization between supporting structure (stiffness) and flexibility was achieved. As those skilled in the art will appreciate that the conception, upon which harmonization between material and structure attributes is based, may readily be utilized as a basis for the designing of other structures for carrying out the present invention.

A basic front panel 402 can be configured solely from an uncovered stiffening material, although a flexible outer covering that blankets the stiffening material yields a preferred front panel embodiment. The flexible outer covering can be selected from a variety of sheet type materials (e.g. fabrics, textiles, and the like). Exemplary materials include: leather, canvas, natural (e.g. cotton), polymeric (synthetic) textiles, or any combination thereof. Polymeric textiles are preferred due to their strength, washability, durability, among other desirable attributes. Said polymeric textiles include materials such as Nylon, Cordura, Polyester, the like, and combination blends thereof.

FIG. 5 illustrates a detailed front view of flat tubular body 106 mounted on seatbelt assembly 110. In the depicted embodiment, flat tubular body 106 is intermeshed with seatbelt assembly 110, wherein seatbelt assembly 110 is channeled through flat tubular body 106 via first tubular opening 302, and exiting through second tubular opening 304. Latch plate 112 can be either attached or buckled onto latch 114 (depicted in FIG. 1) or can optionally hang in the unattached state when animal restraint apparatus 500 is unoccupied.

Figure 6:
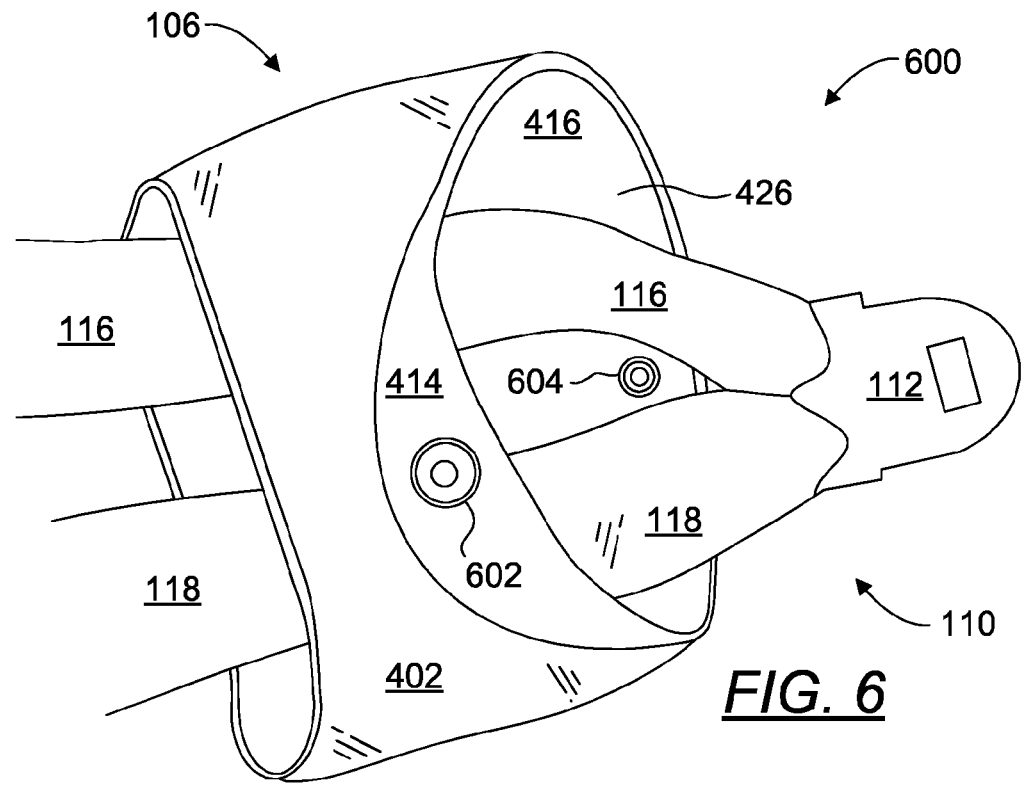
FIG. 6 illustrates a partial internal view of flat tubular body 106 showing mating fasteners 602 and 604. The fastening system functions to provide an impermanent link between flat tubular body 106 and seatbelt assembly 110.

FIG. 6 illustrates a partial internal view of flat tubular body 106 showing an exemplary snap type fastening system having mating fasteners 602 and 604. The fastening system functions to provide an impermanent link between flat tubular body 106 and seatbelt assembly 110. Depicted is a portion of back surface 414 of pliable front panel 402 having first portion of fastener 602 configured to releasably fasten to second portion of fastener 604 located on the corresponding front surface 426 portion of pliable back panel 416. Flat tubular body 106 is releasably linked to seatbelt assembly 110 when mating fasteners 602 and 604 are engaged, thereby providing a means for storing animal restraint apparatus 600 on seatbelt assembly 110 when the device is not in use. A plurality of fasteners, such as mating fasteners 602 and 604, can be utilized to further strengthen the coupling between front surface 426 portion of pliable back panel 416 to corresponding back surface 414 of pliable front panel 402.

The aforementioned fastening system comprises exemplary snap type mating fasteners 602 and 604, it is understood that the directed function can be accomplished by a variety of fastening systems. Fastening systems include, but not limited to: hook and loop, magnetic fasteners, buttons, and the like.

Figure 7:
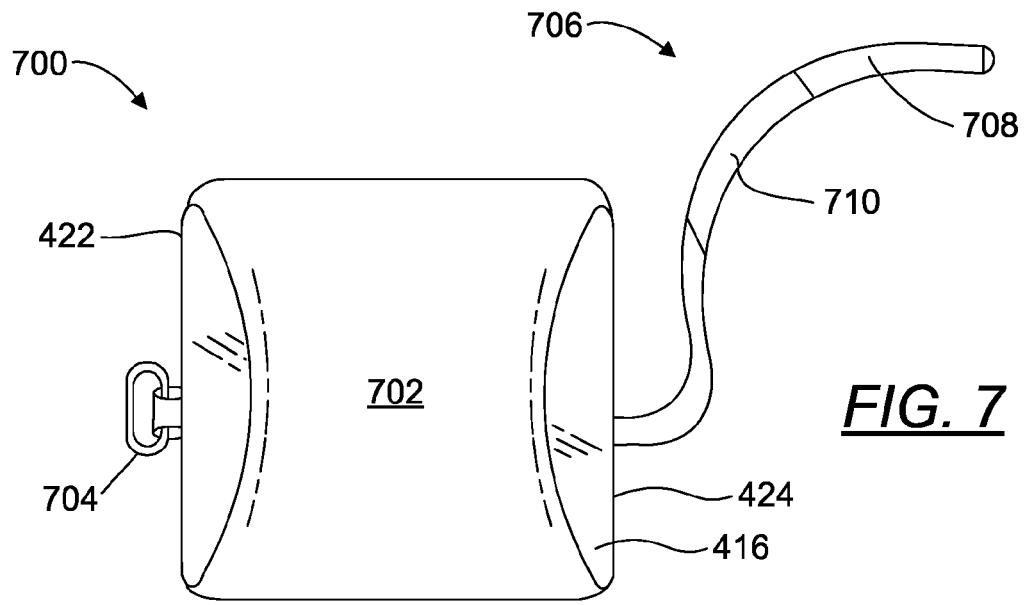
FIG. 7 illustrates a front view of an exemplary animal restraint apparatus 700 having a flat tubular body 702 with an attached back mounting strap 706 utilizing a hook and loop type fastener.

FIG. 7 illustrates a front view of an exemplary animal restraint apparatus 700 having a flat tubular body 702 including a means for releasably engaging flat tubular body 702 to a lower chest portion of a pet. The engaging means depicted in this embodiment includes back strap assembly 706 having a hook and loop based fastening system. One end of back mounting strap 706 is fixedly attached to second side edge 424 of pliable back panel 416. The remaining, opposing end of back mounting strap 706 is configured to loop through and releasably attach to rigid ring 704. Rigid ring 704 is fastened to first side edge 422 of pliable back panel 416.

More specifically, first portion 708 of the hook and loop fastening assembly is affixed to depicted distal portion of back mounting strap 706, and second portion 710 of hook and loop fastening assembly is affixed to the depicted proximate portion of strap assembly. Releasable fastening and strap length adjustment can be simultaneously accomplished when back mounting strap 706 assembly passes through rigid ring 704 and is folded back upon itself such that first portion 708 and second portion of hook and loop fastener are impermanently conjoined.

An additional option for back strap assembly 706 includes a strap where at least a portion of the strap contains an elastic member to impart elastic properties. A back strap assembly 706 that includes elastic properties is able to provide a means for generating a substantially constant engagement pressure directed to the lower chest portion of the engaged pet. Such engagement pressure helps to maintain proper positioning of the device on the pet, especially when the pet is wiggling, twisting, or the like.

Figure 8:
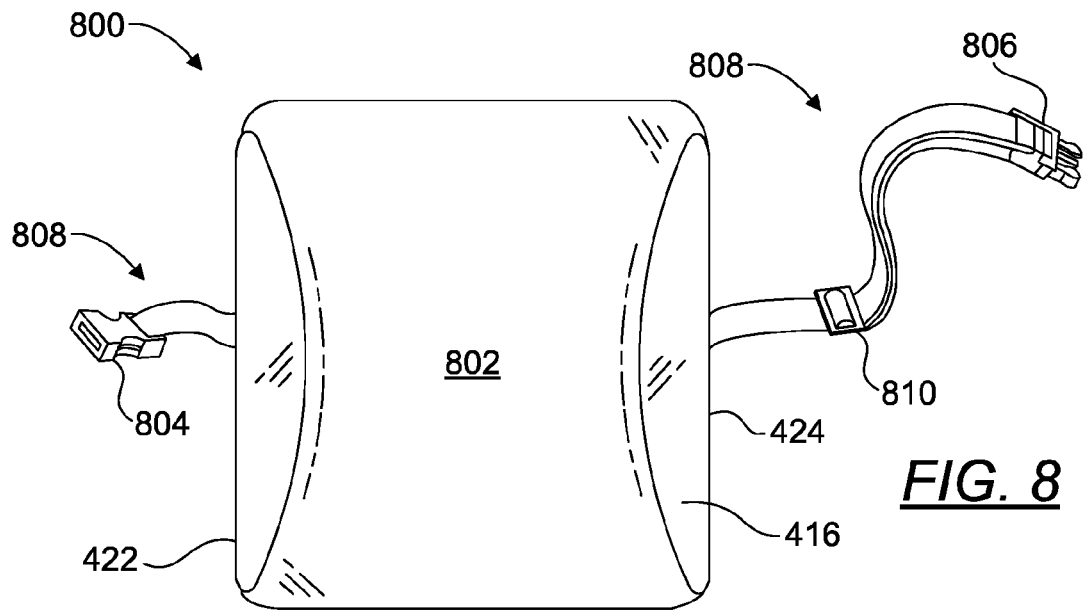
FIG. 8 illustrates a front view of an exemplary animal restraint apparatus 800 having a flat tubular body 802 utilizing back strap assembly 808 employing quick release connectors.

FIG. 8 illustrates a front view of an exemplary animal restraint apparatus 800 having a flat tubular body 802 utilizing back strap assembly 808 employing a quick release connector assembly or system. The quick release connector system includes first portion 804, which is attached to first side edge 422 of pliable back panel 416; and second portion 806, which is attached to distal end of corresponding back mounting strap 808; both quick release connectors are configured for rapid nonpermanent locking engagement. A means for adjusting the length of back mounting strap 808 can be managed by adjustment clip 810. Such a clip can be disposed in-line, accompanying first portion 804 quick release connector, second portion 806 quick release connector, or any combination thereof. Additionally, adjustment clip 810 provides a means for organizing excess strap material, as well as providing a secondary locking mechanism for the prevention of mounting strap slippage.

An additional option for back strap assembly 808 includes a strap where at least a portion of the strap contains an elastic member to impart elastic properties. A back strap assembly 808 that includes elastic properties is able to provide a means for generating a substantially constant engagement pressure directed to the lower chest portion of the engaged pet. Such engagement pressure helps to maintain proper positioning of the device on the pet, especially when the pet is wiggling, twisting, or the like.

Figure 9:
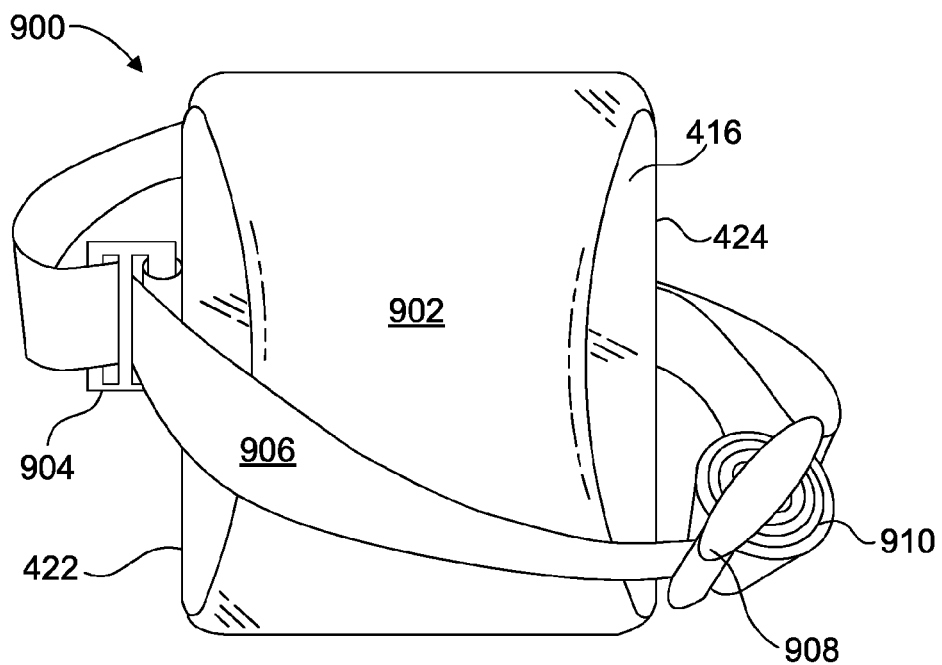
FIG. 9 illustrates a front view of an exemplary animal restraint apparatus 900 having a flat tubular body 902 utilizing back strap assembly 906 employing strap retractor 908.

FIG. 9 illustrates a front view of an exemplary animal restraint apparatus 900 having a flat tubular body 902 utilizing back strap assembly 906 employing strap retractor 908. Proximate portion of back strap assembly 906 is fixedly attached to second side edge 424 of pliable back panel 416, while distal end of back strap assembly 906 is fastened to first side edge 422 of pliable back panel 416 via strap locking means 904—depicted as a simple buckle fastener.

It is understood that the back mounting strap 706 of FIG. 7 (utilizing a hook and loop fastener), as well as the back mounting strap 808 of FIG. 8 (utilizing quick release connectors), can incorporate a strap retractor 908 or like device.

Again referring to FIG. 9, strap retractor 908 provides means for actively accommodating or managing the unused strap portion of back strap assembly 906, where excess strap material is stored on strap/belt coil 910. Strap retractor 908 additionally provides a means for generating a substantially constant engagement pressure between flat tubular body 902 and pet. Strap retractor 908 is depicted for exemplary purposes, it is understood that other types of mechanisms or devices can provide substantially similar functions. An exemplary retractor device, similar to depicted strap retractor 908 is available from the Omix-Ada company located at 460 Horizon Drive, Suwanee, Ga. 30024, USA; and is identified as part number: 13202.07—Retractor Lap Belt Seat.

Figure 10:
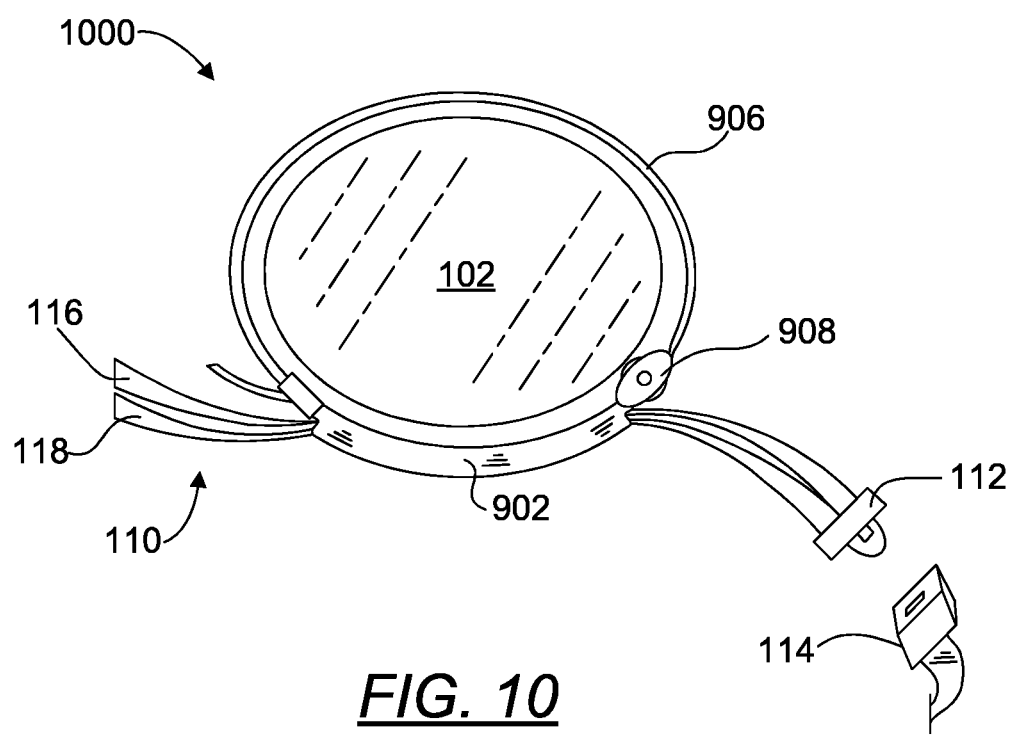
FIG. 10 illustrates a top perspective view of an exemplary animal restraint apparatus 1000 having a flat tubular body 902 utilizing back strap assembly 906 employing strap retractor 908; wherein the apparatus 1000 circumferentially engages dog 102.

FIG. 10 illustrates a top perspective view of an exemplary animal restraint apparatus 1000 shown in FIG. 9. Animal restraint apparatus 1000 possesses a flat tubular body 902 utilizing back strap assembly 906 employing strap retractor 908; wherein the apparatus 1000 circumferentially engages perimeter of dog 102.

What is claimed herein is:

1. An animal restraint apparatus adapted to be releasably fastened to a seatbelt having a waist strap portion and a shoulder strap portion, said animal restraint apparatus, consisting of:
a flat tubular body having a pliable front panel and a pliable back panel, wherein each said panel includes a top edge, a bottom edge, a first side edge, a second side edge, a front surface and a back surface, and
said top edge of said pliable front panel is substantially fastened in a permanently secure manner to said top edge of said pliable back panel, said bottom edge of said pliable front panel is substantially fastened in a permanently secure manner to said bottom edge of said pliable back panel; thereby creating
a generally tubular passage that is continuous in structure having a first tubular opening defined by said first side edge of said pliable front panel and said first side edge of said pliable back panel; and a second tubular opening defined by said second side edge of said pliable front panel, and said second side edge of said pliable back panel, wherein said generally tubular passage is configured for releasably receiving said seatbelt which is comprised of both said waist strap portion and said shoulder strap portion, and
a means for releasably engaging said back surface of said pliable back panel of said flat tubular body to a lower chest portion of a pet.

2. The animal restraint apparatus of claim 1, wherein said means for releasably engaging said flat tubular body to said lower chest portion of said pet comprises at least one back mounting strap having a first end and a second end, said first end of said strap is fixedly attached to said first side edge of said pliable back panel; and said second end of said at least one back mounting strap comprises a means for releasably attaching said second end of said at least one back mounting strap to said second side edge of said pliable back panel.

3. The animal restraint apparatus of claim 2, wherein said means for releasably attaching said second end of said at least one back mounting strap to said second side edge of said pliable back panel, comprises:

a quick release connector having a first portion and a second portion, wherein said first portion is configured to releasably attach to said second portion, and said second end of said at least one back mounting strap includes said first portion of said quick release connector attached thereon, and said second side edge of said pliable back panel includes said second portion of said quick release connector attached thereon.

4. The animal restraint apparatus of claim 2, wherein said means for releasably attaching said second end of said at least one back mounting strap to said second side edge of said pliable back panel, comprises:

a rigid ring for accepting said at least one back mounting strap, wherein said rigid ring is fixedly attached to said second side edge of said pliable back panel, and a hook and loop fastening assembly having a first portion and a second portion, wherein said first portion is configured to releasably attach to said second portion, and said second end of said strap further comprising a second end strap assembly having a top side surface comprising a distal portion and a proximate portion, wherein said first portion of said hook and loop fastening assembly is affixed to said distal portion of said top side surface located on said second end strap assembly, and said second portion of said hook and loop fastening assembly is affixed to said proximate portion of said top side surface located on said second end strap assembly such that said second end strap assembly functions as a means for fastening said second end of said at least one back mounting strap to said second side edge of said pliable back panel when said second end strap assembly passes through said rigid ring and is engagingly folded back upon itself, thereby producing a means for creating a releasable fastening loop for engagement with said rigid ring.

5. The animal restraint apparatus of claim 2, wherein at least a portion of said back mounting strap is elastic.

6. The animal restraint apparatus of claim 2, wherein said back mounting strap further includes an adjustment clip for adjusting the length of said back mounting strap.

7. The animal restraint apparatus of claim 2, wherein said back mounting strap further includes a strap retracting means for actively managing unused portion of said back mounting strap and providing a means for generating a substantially constant engagement pressure between said flat tubular body and said lower chest portion the pet.

8. The animal restraint apparatus of claim 1, wherein at least one of said first side edge of said pliable front panel or second side edge of said pliable front panel is curvilinear.

9. The animal restraint apparatus of claim 1, further comprising a fastening means for attaching a portion of said pliable front panel of said flat tubular body to a corresponding portion of said pliable back panel of said flat tubular body such that said flat tubular body is adapted to receive and releasably link to said seatbelt, wherein said animal restraint apparatus is stored on said seatbelt when not in use.

10. The animal restraint apparatus of claim 9, wherein said fastening means is selected from the group consisting of snaps, buttons, and hook and loop.

11. The animal restraint apparatus of claim 1, further comprising said pliable back panel having a multilayered configuration comprising a flexible sheet material, and a padding material.

12. The animal restraint apparatus of claim 11, wherein said flexible sheet material is selected from the group consisting of leather, canvas, and polymeric textile.

13. The animal restraint apparatus of claim 11, wherein said padding material is configured from a flexible foam of sufficient thickness to serve as a shock absorber and facilitate handling.

14. The animal restraint apparatus of claim 1, further comprising said pliable front panel having a multilayered configuration; said pliable front panel comprising a flexible sheet material covering a pliable stiffening material, wherein said pliable stiffening material is configured to impart a predetermined amount of structure to said front panel while concurrently permitting said front panel to take on a bowed configuration, thereby providing a means for conforming to said lower chest portion of said pet.

15. An animal restraint apparatus adapted to be releasably fastened to a seatbelt having a waist strap portion and a shoulder strap portion, said animal restraint apparatus, consisting of:

a flat tubular body having a pliable front panel and a pliable back panel, wherein each said panel includes a top edge, a bottom edge, a first side edge, a second side edge, a front surface and a back surface, and said top edge of said pliable front panel is substantially fastened in a permanently secure manner to said top edge of said pliable back panel, said bottom edge of said pliable front panel is substantially fastened in a permanently secure manner to said bottom edge of said pliable back panel; thereby creating a generally tubular passage that is continuous in structure having a first tubular opening defined by said first side edge of said pliable front panel and said first side edge of said pliable back panel; and a second tubular opening defined by said second side edge of said pliable front panel, and said second side edge of said pliable back panel, wherein said generally tubular passage is configured for releasably receiving said seatbelt which is comprised of both said waist strap portion and said shoulder strap portion, and at least one back mounting strap for engaging said back surface of said pliable back panel of said flat tubular body to a lower chest portion of a pet, said back mounting strap having a first end and a second end, said first end of said strap is fixedly attached to said first side edge of said pliable back panel; and said second end of said strap comprises a means for releasably attaching said second end of said strap to said second side edge of said pliable back panel.

16. The animal restraint apparatus of claim 15, further comprising said pliable back panel having a multilayered configuration comprising a flexible sheet material, and a padding material.

17. The animal restraint apparatus of claim 15, further comprising said pliable front panel having a multilayered configuration; said pliable front panel comprising a flexible sheet material covering a pliable stiffening material, wherein said pliable stiffening material is configured to impart a predetermined amount of structure to said front panel while concurrently permitting said front panel to take on a bowed configuration, thereby providing a means for conforming to said lower chest portion of said pet.

18. The animal restraint apparatus of claim 17, wherein said pliable front panel includes a curvilinear said first side edge, a curvilinear said second side edge, or any combination thereof.

19. The animal restraint apparatus of claim 15, further comprising a fastening means for attaching a portion of said pliable front panel of said flat tubular body to a corresponding portion of said pliable back panel of said flat tubular body such that said flat tubular body is adapted to receive and releasably link to said seatbelt, wherein said animal restraint apparatus is stored on said seatbelt when not in use.

20. The animal restraint apparatus of claim 19, wherein said fastening means is selected from the group consisting of snaps, buttons, and hook and loop.

\* \* \* \* \*